US010723444B2

(12) United States Patent
Gionta et al.

(10) Patent No.: US 10,723,444 B2
(45) Date of Patent: *Jul. 28, 2020

(54) SPIN RESISTANT AIRCRAFT CONFIGURATION

(71) Applicant: ICON AIRCRAFT, INC., Vacaville, CA (US)

(72) Inventors: Matthew Gionta, Tehachapi, CA (US); Jon Karkow, Tehachapi, CA (US); John Roncz, Elkhart, IN (US); Dieter Koehler, Powell Butte, OR (US); David Lednicer, Redmond, WA (US)

(73) Assignee: ICON AIRCRAFT, INC., Vacaville, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/892,638

(22) Filed: Feb. 9, 2018

(65) Prior Publication Data

US 2018/0178903 A1 Jun. 28, 2018

Related U.S. Application Data

(63) Continuation of application No. 15/090,945, filed on Apr. 5, 2016, now Pat. No. 9,926,071, which is a
(Continued)

(51) Int. Cl.
*B64C 21/10* (2006.01)
*B64C 21/00* (2006.01)
(Continued)

(52) U.S. Cl.
CPC ............... *B64C 21/10* (2013.01); *B64C 3/10* (2013.01); *B64C 3/58* (2013.01); *B64C 5/02* (2013.01);
(Continued)

(58) Field of Classification Search
CPC ........... B64C 21/10; B64C 21/00; B64C 3/10; B64C 5/02; B64C 35/001; B64C 35/008; B64C 23/06; Y02T 50/162
(Continued)

(56) References Cited

U.S. PATENT DOCUMENTS 2,210,642 A * 8/1940 Thompson ............... B64C 5/08
244/35 R
2,964,271 A 12/1960 Strawn
(Continued)

FOREIGN PATENT DOCUMENTS

GB 407009 A 3/1934

OTHER PUBLICATIONS

Mexican Patent Office; Patent Application No. MX/a/2015/000626; English Translation of Third Official Action received from Mexican associates dated Sep. 27, 2018.
(Continued)

*Primary Examiner* — Brian M O'Hara
*Assistant Examiner* — Keith L Dixon
(74) *Attorney, Agent, or Firm* — Martensen IP (57) ABSTRACT

A configuration and system for rendering an aircraft spin resistant is disclosed. Resistance of the aircraft to spinning is accomplished by constraining a stall cell to a wing region adjacent to the fuselage and distant from the wing tip. Wing features that facilitate this constraint include but are not limited to one or more cuffs, stall strips, vortex generators, wing twists, wing sweeps and horizontal stabilizers. Alone or in combination, aircraft configuration features embodied by the present invention render the aircraft spin resistant by constraining the stall cell, which allows control surfaces of the aircraft to remain operational to control the aircraft.

9 Claims, 8 Drawing Sheets

Related U.S. Application Data continuation of application No. 13/946,572, filed on Jul. 19, 2013, now Pat. No. 9,327,828.

(60) Provisional application No. 61/674,267, filed on Jul. 20, 2012.

(51) Int. Cl.
  *B64C 3/10* (2006.01)
  *B64C 3/58* (2006.01)
  *B64C 23/06* (2006.01)
  *B64C 35/00* (2006.01)
  *B64C 5/02* (2006.01)

(52) U.S. Cl.
  CPC ............... *B64C 21/00* (2013.01); *B64C 23/06* (2013.01); *B64C 35/001* (2013.01); *B64C 35/008* (2013.01); *Y02T 50/12* (2013.01); *Y02T 50/162* (2013.01)

(58) Field of Classification Search
  USPC ........................................... 244/199.1
  See application file for complete search history.

(56) References Cited

U.S. PATENT DOCUMENTS

| | | | |
|---|---|---|---|
| 3,370,810 A | 2/1968 | Shevell | |
| 4,323,209 A * | 4/1982 | Thompson | B64C 23/06 244/199.1 |
| 4,334,654 A | 6/1982 | Mackenzie | |
| 4,354,648 A * | 10/1982 | Schenk | B64C 3/58 244/130 |
| 4,706,910 A * | 11/1987 | Walsh | B64C 21/10 114/67 R |
| 4,776,542 A * | 10/1988 | Van Dam | B64C 3/10 244/198 |
| 4,836,473 A * | 6/1989 | Aulehla | B64C 21/00 244/130 |
| 5,253,828 A * | 10/1993 | Cox | B64C 23/06 244/200.1 |
| 5,598,990 A * | 2/1997 | Farokhi | B64C 23/06 244/198 |
| 5,634,613 A * | 6/1997 | McCarthy | B64C 23/06 244/199.1 |
| 5,772,155 A * | 6/1998 | Nowak | B64C 5/08 244/200.1 |
| 6,578,798 B1 * | 6/2003 | Dizdarevic | B64C 23/069 244/199.1 |
| 7,234,914 B2 * | 6/2007 | Usab, Jr. | F01D 5/142 415/1 |
| 7,503,527 B1 * | 3/2009 | Fairchild | B64C 3/54 244/218 |
| 7,520,470 B2 * | 4/2009 | Lucchesini | B64C 1/0009 244/199.1 |
| 7,537,182 B2 * | 5/2009 | Greenblatt | B64C 3/141 137/831 |
| 8,152,109 B2 * | 4/2012 | Silich | B64C 15/14 244/199.4 |
| 9,327,828 B2 * | 5/2016 | Gionta | B64C 21/00 |
| 2010/0123047 A1 | 5/2010 | Williams | |
| 2011/0120540 A1 | 5/2011 | Huang et al. | |
| 2011/0126891 A1 | 6/2011 | Goto et al. | |

OTHER PUBLICATIONS

IconAircraft, Inc.: "About Spins and Spin Resistance", http://www.iconaircraft.com/news/about-spins-andspin-resistance.html, Apr. 8, 2014.

Lin J C Ed—Platzer Max et al.,"Review of Research on Low-Profile Vortex Generators to Control Boundary-Layer Separation", Progress in Aerospace Sciences, Jan. 1, 2002, pp. 389-420, vol. 38,Oxford, Great Britain.

PCT/US2013/051355, "International Preliminary Report on Patentability", dated Jan. 20, 2015.

PCT/US2013/051355, "International Search Report", dated Apr. 8, 2014.

PCT/US2013/051355, "Written Opinion of the International Searching Authority", dated Apr. 8, 2014.

\* cited by examiner

SPIN RESISTANT AIRCRAFT CONFIGURATION

RELATED APPLICATION

The present application is a continuation of, and claims the benefit of, U.S. Non-Provisional application Ser. No. 15/090,945 filed 5 Apr. 2016, which is a continuation of U.S. Non-Provisional application Ser. No. 13/946,572 filed 19 Jul. 2013, now U.S. Pat. No. 9,327,828 which claims priority to U.S. Provisional Patent Application No. 61/674,267 filed Jul. 20, 2012, which are hereby incorporated by reference in their entirety for all purposes as if fully set forth herein.

BACKGROUND OF THE INVENTION

Field of the Invention

Embodiments of the present invention relate, in general, to aerodynamic techniques designed to deter an aircraft's ability to enter a spin and more particularly to a configuration of said techniques that renders an aircraft spin resistant.

Relevant Background

The primary cause of fatal accidents in small aircraft is loss of control. Loss of control usually occurs because the aircraft enters a flight regime that is outside its normal envelope usually, but not always, at a high rate, thereby introducing an element of surprise for the flight crew. Factors leading to a loss of control are many including loss of situational awareness especially through distraction and/or complacency, intended or unintended mishandling of the aircraft, attempting to maneuver an aircraft outside its capabilities to resolve a prior problem, and the like. While every out of control situation is unique, one loss of control flight regime that every pilot it taught to avoid is a spin.

In aviation, a spin is an aggravated stall resulting in autorotation about a spin axis wherein the aircraft follows a corkscrew downward path. Stalls in fixed-wing flight are often experienced as a sudden reduction in lift as the pilot increases angle of attack and exceeds the critical angle of attack (which may be due to slowing down below stall speed in level flight). Spins can be entered intentionally or unintentionally, from any flight attitude and from practically any airspeed—all that is required is a sufficient amount of yaw (rotation about a vertical axis) while an aircraft is stalled. In either case, however, a specific and often counterintuitive set of actions may be needed for an effective recovery to be made. If the aircraft exceeds published limitations regarding spins, or is loaded improperly, or if the pilot uses incorrect techniques to recover, the spin can, and often does, lead to a crash.

In a spin, both wings are in a stalled condition, but one wing will be in a deeper stall condition than the other. This causes the aircraft to autorotate (yaw) towards the deeper-stalled wing due to its higher drag. At the same time, the wings produce an unbalanced amount of lift causing the aircraft to roll and similarly adjust its pitch. An autorotation or spin is thus a stalled condition in which there is simultaneous movement around all three aircraft axes—that is, yaw, pitch, and roll. And as mentioned, a spin results in a vertical flight path. That is to say the aircraft is falling directly to the earth as it spins.

Figure 1:
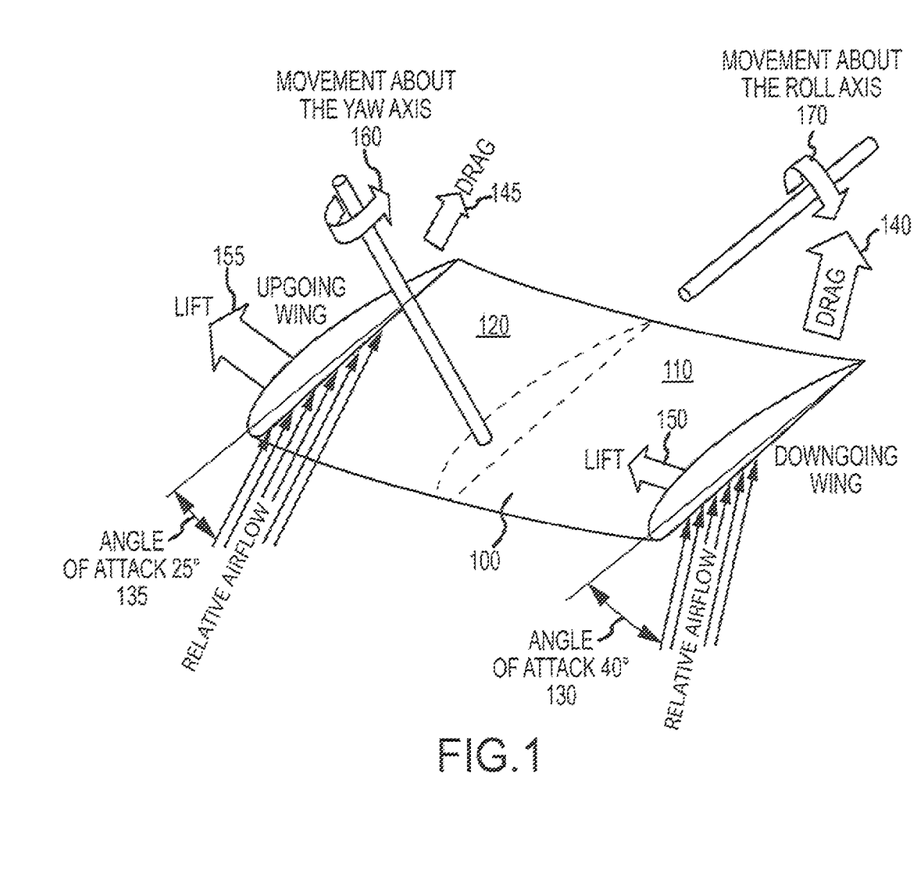
FIG. 1 is a depiction of aerodynamic conditions present in a spin as would be known to one of reasonable skill in the relevant art.

FIG. 1 is a high level depiction of the interaction of aerodynamic forces acting on a wing going into a spin as is known by one of reasonable skill in the relevant art. For discussion purposes, the wing 100 is divided into two portions designated by the direction the wing portion will go in a spin. In this particular illustration, there is a down-going wing portion 110 and an up-going wing portion 120. For an aircraft to spin, the wing must be stalled. In this example, the wing 100 is experiencing an angle of attack that is greater than the critical angle of attack and thus, a stalled condition results. Here both the down-going wing portion 110 and the up-going wing portion 120 are experiencing a stalled condition. However in this case, the down-going wing portion 110 possesses an angle of attack of 40 degrees 130 while the up-going wing portion 120 has an angle of attack of 25 degrees 135. The angle of attack of both wing portions 110, 120 exceeds the critical angle and are both stalled, yet the stall is not symmetrical. As the down-going wing portion 110 has a higher angle of attack 130, it will generate more drag 140 and less lift 150 than, comparatively, the drag 145 and the lift 155 of the up-going wing portion 120. The unbalanced forces result in the wing 100 yawing 160 and rolling 170 simultaneously.

Spins, typified by an excessive angle of attack and slow airspeed, differ from spiral dives which are characterized by low angle of attack and high airspeed. In a spiral dive, the airplane will respond conventionally to the pilot's inputs to the flight controls whereas in a spin, the aircraft's response to flight controls is compromised.

Some aircraft cannot be recovered from a spin using only their own flight control surfaces. Accordingly, if an aircraft has not been certified for spin recovery, it is assumed that spins are not recoverable and engaging in a spin is considered unsafe in that aircraft. For safety, all certificated, single-engine fixed-wing aircraft, including certificated gliders, must meet specified criteria regarding stall and spin behavior. Complying designs typically have a wing with greater angle of attack at the wing root (the part of the wing that is closest to the fuselage) than at the wing tip, so that the wing root stalls first, reducing the severity of the wing drop at the stall and possibly also allowing the ailerons to remain somewhat effective in controlling the aircraft's rolling movements until the stall migrates outward toward the wing tip. This ideally provides the pilot with some ability to control the aircraft in a stalled condition and preclude a spin from developing.

Beyond specifying criteria by which an aircraft must demonstrate certain stall and spin behavior, the Code of Federal Regulations that governs Aeronautics and Space, specifically 14 CFR § 23.221(a)(2), provides criteria by which an aircraft can be demonstrated to be "spin resistant." Prior to the implementation of the present invention, no conventionally-configured aircraft has been able to successfully complete spin-resistance flight testing and demonstrate spin resistance in accordance with the 14 CFR § 23.221(a)(2) standard.

In the 1970s and 1980s, researchers at NASA's Langley Research Center studied spin resistance in depth, with a focus on aerodynamic characteristics and techniques to make aircraft more resistant to spins. They performed extensive modifications to several aircraft and flew thousands of test flights to determine how changes to the airframe would affect spin characteristics. What they discovered was that small changes could dramatically affect performance during spins. As a result of the study aircraft and according to NASA experimenters, aircraft should be designed to "give plenty of warning, lots of buffet, very little roll-off laterally—a long period of telling the pilot, 'Hey, you're doing something wrong'."

One of the key findings of the NASA studies was that a critical component of spin resistance is controlling the way the wing stalls. Experimenters concluded that having the stall initiate near the root of the wing while the outboard panels of the wing continue to fly is ideal because it prevents the stall from fully developing or "breaking" because the outboard panels are still generating lift. Without a stall, a spin cannot initiate.

Part 23, § 23.221 of 14 CFR requires that single-engine airplanes must demonstrate recovery from either a one-turn spin if intentional spins will be prohibited or six-turn spins if intentional spins will be approved. Even more advantageous than an aircraft able to recover from a spin is an aircraft that is resistant to spin entry. Despite decades of research and an understanding of the interaction between stalls and spins, the design of an aircraft meeting the standards of 14 CFR § 23.221 has remained a challenge. This and other obstacles of the prior art are addressed by one or more embodiments of the present invention. That is to say, the present invention provides an aircraft configuration that is spin resistant and in compliance with 14 CFR § 23.221(a)(2).

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Hereafter described in various embodiments and by way of example is a configuration and system for rendering an aircraft spin resistant. Resistance of the aircraft to spinning is accomplished by constraining a stable stall cell or pattern of stall cells to a wing region adjacent to the fuselage and distant from the wing tip.

According to one embodiment of the present invention, a wing is comprised of two contiguous regions. A first region is adjacent to the fuselage and a second region is adjacent to the wing tip. A cuff operable to form a boundary between the first region and the second region is included in one embodiment. The inclusion of this cuff introduces energy into the airflow such that an aerodynamic fence is established on the upper surface of the aircraft and subsequently inhibits the progression of the stall cell from the first region toward the second region.

In accordance with another embodiment, the first region of the wing includes one or more stall strips, which function as fixed aerodynamic devices operable to modify the airfoil and, consequently, the airflow around the airfoil. In an exemplary embodiment, stall strips act in concert with characteristics of the fuselage and wing to create a condition that, when the aircraft is in a high angle of attack condition, the airflow interaction between the root and the wing is such that the stall is initiated first at the root and progresses outward toward the wing tip.

Yet another embodiment of the present invention locates one or more vortex generators on one or more portions of the wing. The vortex generators operate to delay airflow separation on the section of the wing adjacent to the wing tip, thus constraining the stall to the wing region adjacent to the fuselage.

According to yet another embodiment of the present invention, the configuration of the wing includes a wing twist, thereby initiating a stalled condition first at the root that then progresses outward toward the wing tip as the angle of attack increases.

The wing configuration of the present invention, in accordance with yet another embodiment, comprises a forward-swept outboard wing panel, which allows that portion of the wing to maintain attached airflow sufficient to provide positive control characteristics.

Alone or, preferably, in combination, the aircraft configuration features embodied by the present invention render the aircraft spin resistant by constraining a stable stall cell or pattern of cells to the wing region adjacent to the fuselage, which permits control surfaces of the aircraft to remain operational to control the aircraft.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Disclosed hereafter by way of example is a novel configuration of aerodynamic features that results in an aircraft that is fully spin resistant. According to one embodiment of the present invention, the interaction of various aerodynamic techniques results in an aircraft that is resistant to spin entry throughout the flight test envelope stated in the United States Federal Aviation Administration ("FAA") Regulations. One aspect of the present configuration/combination is a cuffed wing design that employs multiple proprietary airfoils across the span of the wing that controls the progression of a stall to create a stabilized stall cell. This discontinuity on the leading edge of the wing delineates the wing into two distinct regions. The outboard (away from the center line) segments of cuffed wings have a different airfoil with a drooped leading edge as compared to the inboard segments of the wing, which causes the outboard portion of the wing to stall later than the inboard portion of the wing as angle of attack increases. Because the ailerons are located on the outboard panel that is still lifting, roll control is preserved even after the inboard panel of the wing has fully stalled. Accordingly, the root sections of the wing possess higher angles of attack across the span and thus stall before the wing tip or outboard portions of the wing. The cuff also operates as a fence, trapping separated airflow to inboard sections of the wing, while the airflow associated with the outboard sections of the wing remains attached to the wing. The cuff in this aspect acts as large vortex generator whose vortex is shed over the upper surface of the wing trapping separated airflow to the inboard sections. These and other features of the present invention form a configuration that is spin resistant.

Many types of airplanes will spin when the pilot simultaneously yaws and stalls the airplane (intentionally or unintentionally). One common scenario that can lead to an unintentional spin is an uncoordinated turn towards the runway during the landing sequence. A pilot who is overshooting the turn to final approach may be tempted to apply rudder to increase the rate of turn. The result is twofold: the nose of the airplane drops below the horizon and the bank angle increases. Reacting to these unintended changes, the pilot may then begin to pull the elevator control aft (toward the tail of the aircraft, thus increasing the angle of attack) while applying opposite aileron to decrease the bank angle. Taken to its extreme, this cross-control input can result in an uncoordinated turn with sufficient angle of attack to cause the aircraft to stall. This is called a cross-control stall, and is very dangerous if it happens at low altitude where the pilot has little time to recover. Add in a little yaw and the loss of control can quickly evolve into a spin. To avoid this scenario, pilots are taught the importance of always making coordinated turns and avoiding situations that require last minute corrections.

The spinning equation is further complicated by individual aircraft characteristics. For example, the likelihood of an aircraft entering a spin is significantly influenced by the position of the center of gravity. In general terms, the further forward the center of gravity is, the less readily the airplane will spin and the more readily the airplane will recover from a spin. Conversely, the further aft the center of gravity is, the more readily the airplane will spin and the less readily the airplane will recover from a spin. In any airplane, the forward and aft limits on center of gravity are carefully defined. In some airplanes that are approved for intentional spinning, the aft limit at which spins may be attempted is not as far aft as the aft limit for general flying.

One or more embodiments of the present invention present a configuration of an amphibious aircraft that is spin resistant. An amphibious aircraft or amphibian is an aircraft that can take off and land on both land and water. Amphibians are fixed-wing aircraft that are equipped with retractable wheels, at the expense of extra weight and complexity, plus diminished range and fuel economy compared to planes designed for either land or water only.

While amphibious aircraft exhibit many of the same flight characteristics as land-based aircraft, they do possess unique aerodynamic features and center of gravity concerns. For example, the lower portion of the aircraft is a watercraft hull and as the aircraft must obtain speeds sufficient to transition to flight, it must plane on top of the water. These characteristics cannot only influence the center of gravity but can also create drag in a high angle of attack situation.

Embodiments of the present invention introduced above are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Like numbers refer to like elements throughout. In the figures, the sizes of certain lines, layers, components, elements or features may be exaggerated for clarity. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term substantially it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The angle of attack of an aircraft is the acute angle between an aircraft's mean wing chord or other defined aircraft longitudinal axis and the direction of the relative free stream wind. A chord line is a line drawn from the trailing edge of the wing to the farthest forward point on the leading edge of the wing.

A stall is a condition in aerodynamics and aviation wherein the angle of attack increases beyond a certain point such that the lift begins to decrease and drag increases. The angle at which this occurs is called the critical angle of attack. This critical angle is dependent upon the profile of the wing, its planform, its aspect ratio, and other factors, but is typically in the range of 8 to 20 degrees relative to the incoming wind for most subsonic airfoils. The critical angle of attack is the angle of attack on the lift coefficient versus angle-of-attack curve at which the maximum lift coefficient occurs.

An airfoil is the shape of a wing as seen in a cross section. The airfoil shape produces aerodynamic forces resulting in lift. Most foil shapes require a positive angle of attack to generate lift, but cambered airfoils can generate lift at zero angle of attack. This "turning" of the air in the vicinity of the airfoil creates curved streamlines which results in lower pressure on one side and higher pressure on the other. This pressure difference is accompanied by a velocity difference, via Bernoulli's principle, so the resulting flow-field about the airfoil has a higher average velocity on the upper surface than on the lower surface.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Figure 2:
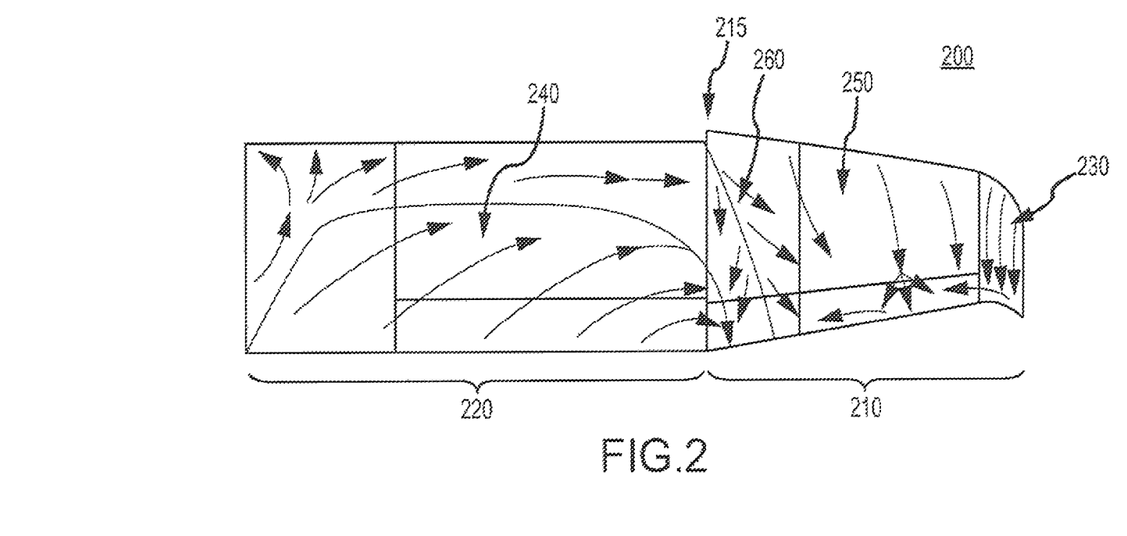
FIG. 2 illustrates a planform (outline of an object as viewed from above) view of a spin resistant wing configuration and associated stalled airflow characteristics according to one embodiment of the present invention.

FIG. 2 shows a high-level plan view depiction of a wing associated with the spin resistant configuration according to one embodiment of the present invention. The wing 200 can be considered to be divided into two sections, an outboard wing section 210 and inboard wing section 220. The two portions of the wing are separated by a wing cuff 215 on the leading edge located in one embodiment at 50% of the wing semi-span. In other embodiments the cuff can be positioned farther outboard with locations ranging between 50 and 70% of the wing semi-span. Outboard of the wing cuff 215 the leading edge sweeps backwards slightly while the trailing edge includes a slight forward sweep. The wingtip includes an anhedral/dihedral combination with a rearward extending feature. FIG. 2 further includes the on-body airflow characteristics of the wing in a full stall condition. As can be seen, the inboard section 220 presents a classic reverse airflow or separated airflow phenomena 240 while the outboard section 210 of the wing maintains attached airflow 250. The wingtip 230 also experiences minor vortex generation. FIG. 2 illustrates that the wing 200 in a full stall condition maintains suitable airflow across control surfaces (the ailerons are located on the outboard section of the wing) to maintain control of the aircraft. While the wing may not be able to provide adequate lift to support level flight, portions of the wing maintain attached airflow sufficient to provide positive control characteristics.

As described in more detail below, the wing cuff 215 introduces energy into the airflow such that an aerodynamic fence is established on the upper surface of the wing. The fence inhibits the progression of the stall, separated airflow, outboard of a line 260 running from the cuff 215 to the trailing edge.

Figure 3:
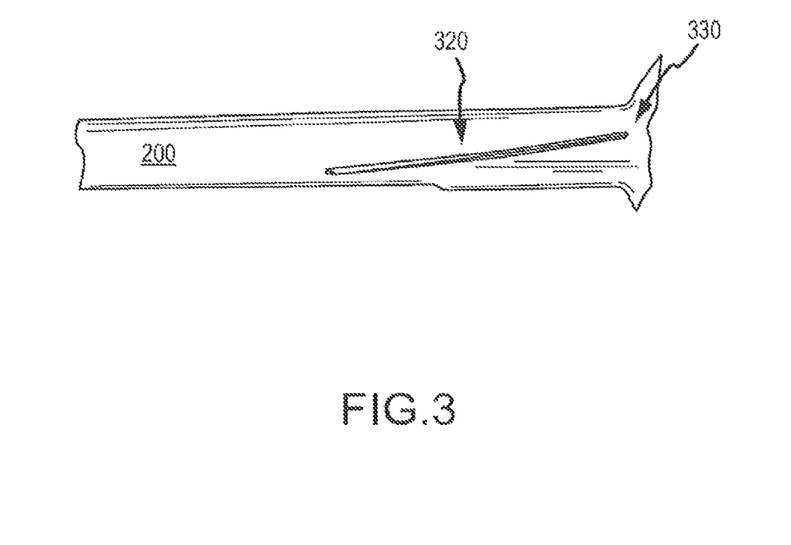
FIG. 3 shows an angular implementation of an inboard (toward the center line) stall strip as associated with one embodiment of a spin resistant configuration of the present invention.

Another aspect of one embodiment of the spin resistant design of the present invention is the inclusion of a stall strip near the wing root. FIG. 3 shows an angular implementation of a stall strip located on near the root 330 of a wing 200 according to one embodiment of the present invention. A stall strip is a fixed aerodynamic device employed on a fixed-wing aircraft to modify the airfoil. Stall strips are usually employed in pairs, symmetrically on both wings. In rare installations, they are employed as a single strip on one wing to correct aberrant stall behavior. Normally stall strips are employed to generate a stalled condition near the root of the wing so as to produce turbulent airflow over the tail control surfaces prior to the stall of the entire wing. In such a manner, the impending stall is communicated to the pilot.

According to one embodiment of the present invention, one or more stall strips located on the inboard section of the wing are positioned to initiate and stabilize an integer number of stall cells on the inboard section of the wing. In an exemplary embodiment, a wing with an aspect ratio of 9 and a wing cuff root located at 60% of the wing semi-span, a stall strip is positioned at the mid-span of the inboard section of the wing. In this position, the stall strip is operable to initiate and hold a single stall cell on the inboard section of the wing.

In one embodiment of the present invention, stall strips act in concert with the characteristics of the fuselage and wing to create a condition that, when the aircraft is in a high angle of attack condition, the airflow interaction between the root and the wing is such that the stall is initiated first at the root and progresses outward toward the wing tip. As can be seen in FIG. 3, the stall strip 320 is positioned near the root 330 of the wing 200 and oriented diagonally downward as seen from the front of the aircraft along a span such that the highest portion of the stall strip 320 is at the root 330 above the leading edge and the lowest portion of the stall strip 320 extends downward in the direction of the wing tip toward the leading edge. The angular orientation of the stall strip is combined with a wing twist (discussed below) that initiates a stalled condition first at the root 330 and then progresses outward as the angle of attack is increased.

Figure 4:
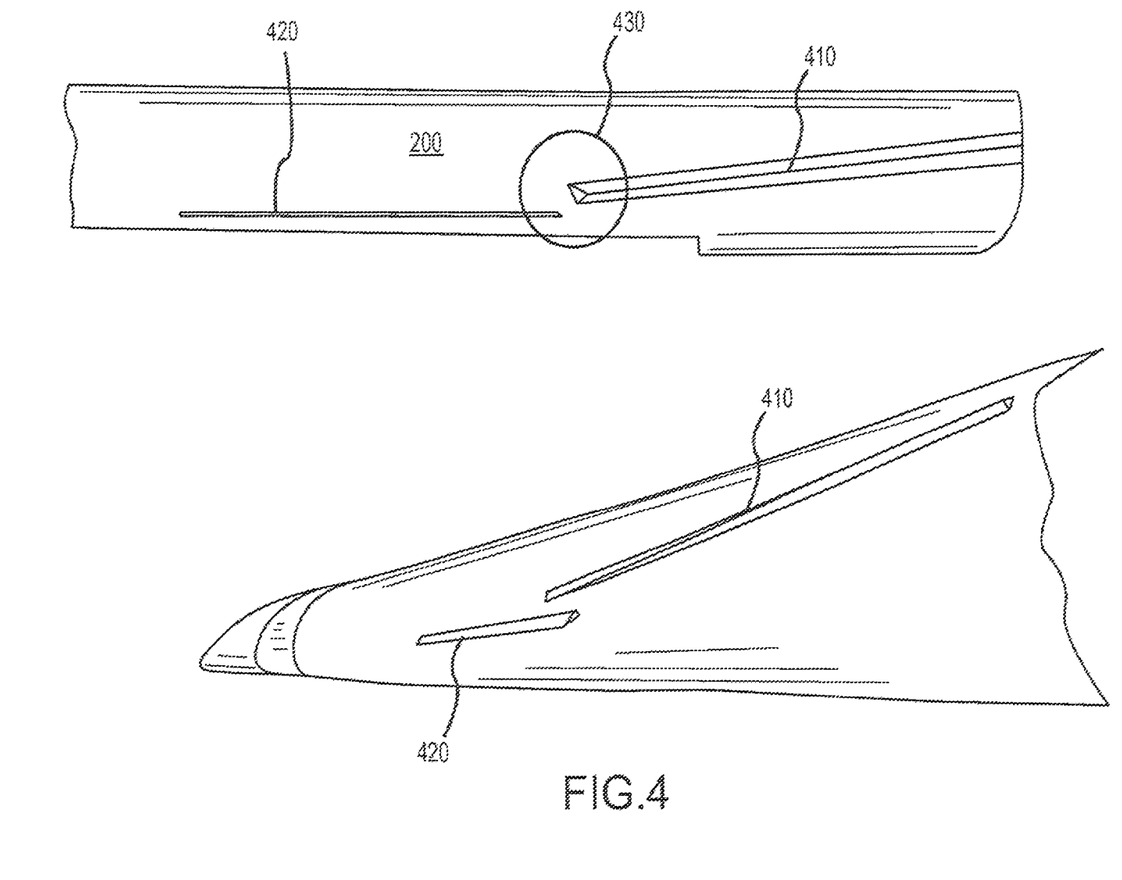
FIG. 4 depicts an implementation of dual overlapping stall strips as associated with one embodiment of a spin resistant configuration of the present invention.

In another embodiment of the present invention and as shown in FIG. 4, a pair of stall strips are positioned on the leading edge of the inboard section of the wing to control stall progression. Before intersecting the leading edge of the wing 200 the first or primary stall strip 410 concludes and is overlapped 430 by a second stall strip 420. The second or secondary stall strip 420 begins slightly inboard of the termination of the primary stall strip 410 and continues outward along the leading edge of the wing for a predetermined distance before it terminates. In one embodiment, the secondary stall strip 420 concludes prior to reaching the cuff 215.

In other embodiments of the present invention, the stall strips are aligned with the leading edge of the wing and positioned to form a stable stall cell (as shown in FIG. 2) beginning at the fuselage and extending to the cuff. In yet other embodiments, the stall strips are curved with respect to the leading edge, wing twisted and airfoil varied to control the progression of the stall as the critical angle of attack is reached. As mentioned above with reference to FIG. 2, the vortex generated by the cuff 215 also translates outward toward the wing tip as it interacts with separated, reverse flow on the inboard sections 220 of the wing 200 and turbulent but remains as attached flow on the outboard sections 210 of the wing 200.

Figure 5:
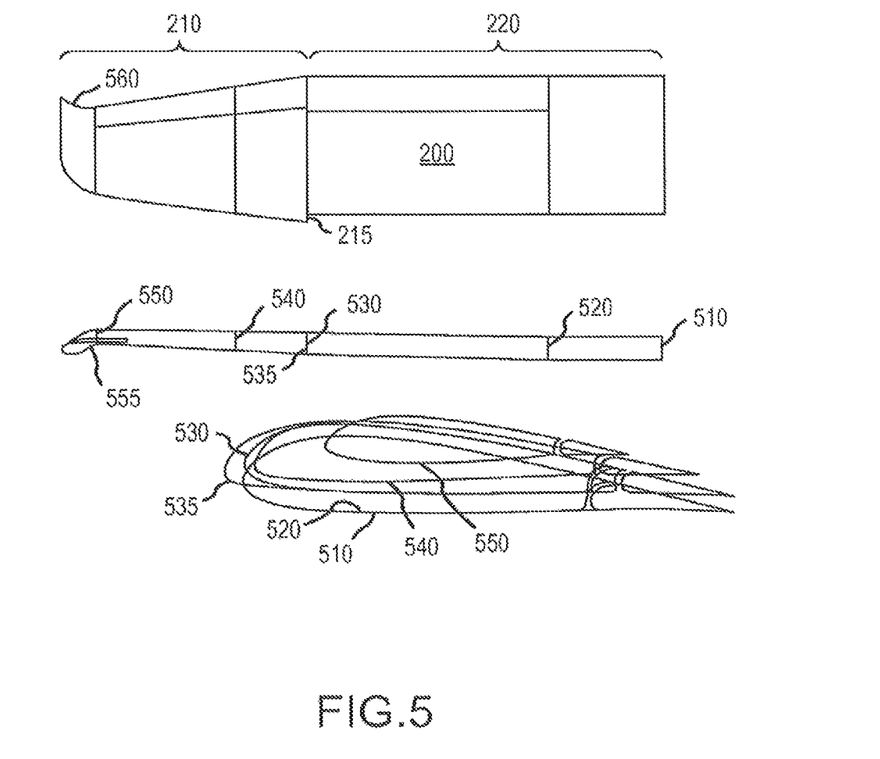
FIG. 5 is a combined planform, front and end view of a wing associated with one embodiment of a spin resistant configuration of the present invention.

Turning attention in addition to FIG. 5, one can see a combined planform, front and end view of a wing associated with one embodiment of a spin resistant configuration of the present invention. The cuff 215 portion of the present invention not only extends the cord of the wing 200 forward but also lowers the leading edge at a discrete position along the span of the wing 200. The effect of the cuff 215 along with varied airfoils along the span of the wing 200 is to create an aerodynamic fence via a vortex that traps separated airflow on the inboard section 220 of the wing 200. Accordingly, while the inboard section 220 of the wing 200 is in a full stall, the airflow associated with the outboard section 210 of the wing 200 remains attached. In another embodiment, a cuff segment is incorporated into the wing rather than a single or unilateral notch as shown in FIG. 5. This type of segment cuff produces bilateral opposing voracities as opposed to a unilateral vortex. Moreover, the segmented cuff can be combined with a unilateral or typical cuff so as to render multiple barriers operable to stabilize and control the stall cell.

In yet another embodiment, different wing cuff sections are included in the profile of the wing's span, each with different configurations. The introduction of multiple cuffs produces one or more pronounced and controllable fences, trapping the stall cell. Stall strips, as described above, are incorporated inboard of the cuff to enhance the separation of flow on the inboard section of the wing at a high angle of attack.

Another aspect of the present invention is the inclusion of washout to the inboard or outboard wing segments. According to one embodiment, 1.5 degrees of washout is included in the wing. For the purpose of this description, washout is defined as wing twist such that the wing incidence decreases from inboard wing stations towards outboard stations. Other embodiments of the present invention include other distributions of wing twist. Exemplary embodiments of the present invention include a wing twist of 0.5 degrees up to 3 degrees.

Along the span of the wing 200 one configuration aspect of the present invention that aids in its ability to be spin resistant is not only the twist of the wing but the ability to vary the airfoil along the span of the wing. FIG. 5 identifies, in one embodiment, five distinct positions in which the wing 200 exhibits a different airfoil shape and/or configuration. In some cases, the airfoil size, that is to say the chord length and angular orientation, may vary while in other embodiments, the airfoil shape may vary. In the latter case, the wing 200 begins at the root with a first airfoil cross section 510 that remains constant for a portion of inboard section 220 of wing. At approximately 50% semi-span, the airfoil changes from the inner profile 520 to that of an inner cuff profile 530. Throughout this section the leading edge and trailing edge remain the same (i.e. the wing has no twist). At the cuff 215, the leading edge of the airfoil 535 is extended forward while the trailing edge remains coincident. This is the longest chord length of the wing 200. From this point to the wingtip, the wing 200 tapers with the leading edge retreating and the trailing edge sweeping forward. Approximately 25% of the distance from the cuff root 215 to the wingtip, a fifth airfoil configuration 540 can be seen. The airfoil and wing 200 continues to vary continuously to the wingtip at which a wingtip airfoil 550 transitions into an anhedral wing tip 555 with a retreating trailing edge 560.

In other combinations of the present invention the location and amount of wing taper and trailing edge forward sweep can vary so as to maximize the ability to trap and control the placement of the stall cell near the wing root.

In the one embodiment, a wing cuff is positioned at 50% semi-span with vortex generators, angled at 15 degrees to the aircraft longitudinal axis and positioned on the outboard wing panel. Each vortex generator is spaced by 3 inches. To energize the airflow and in other embodiments of the present invention the vortex generators are spaced between 2 and 4 inches with the angle of each generator ranging from 10 to 20 degrees to the aircraft longitudinal axis. Finally, stall strips are located on the inboard section of the wing, that is, inboard of the cuff, as described above. The most inboard stall strip is angled downward at 7 degrees (front view, root to wing tip) and located at 11-25% semi-span with another stall strip located outboard of the first at positions 24-35% semi-span parallel to the leading edge. As one of reasonable skill in the relevant art can appreciate the location and angular variation of the stall strips can vary. Indeed while the present embodiment presents a linear stall strip disposed at 7 degrees from the leading edge, other embodiments can have more or less of an angular orientation based on the wing twist in that particular section and alterations of the effective or local angle of attack. For example a wingspan having a more pronounced wing twist may have the stall strips less angled to overall provide a similar stall initiation phenomena at the root. Also the stall strip itself may be curvilinear rather than straight based again on the stall initiation and stall cell characteristics. The stall strips are arranged and orientated to make sure that the stall is initiated at the root and progresses in a controlled manner so that stall cell can be captured apart from any control surfaces which, under separated flow of a stall, can be rendered ineffective.

According to one configuration of the present invention, the angle of incidence is modified along the span of the wing such that at 0-19% semi-span, it is 5 degrees and changes to 2 degrees at 60% semi-span. The wing twist then further reduces to 1 degree at the wing tip (100% semi-span). In this embodiment, the wing cuff is positioned at 60% semi-span and vortex generators, angled at 15 degrees and spaced by 3 inches, are located on the outboard wing panel at 10% chord. Finally, a single stall strip is located at 33-39% wing semi-span which is parallel to the leading edge.

Figure 6:
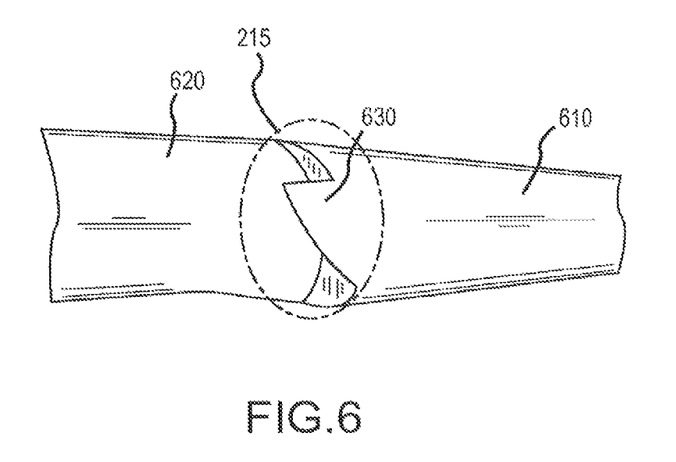
FIG. 6 shows one embodiment of a wing cuff root vortex generator (operable to, for example, delay airflow separation along the wing/fuselage juncture) as associated with one embodiment of a spin resistant configuration of the present invention.
Figure 7:
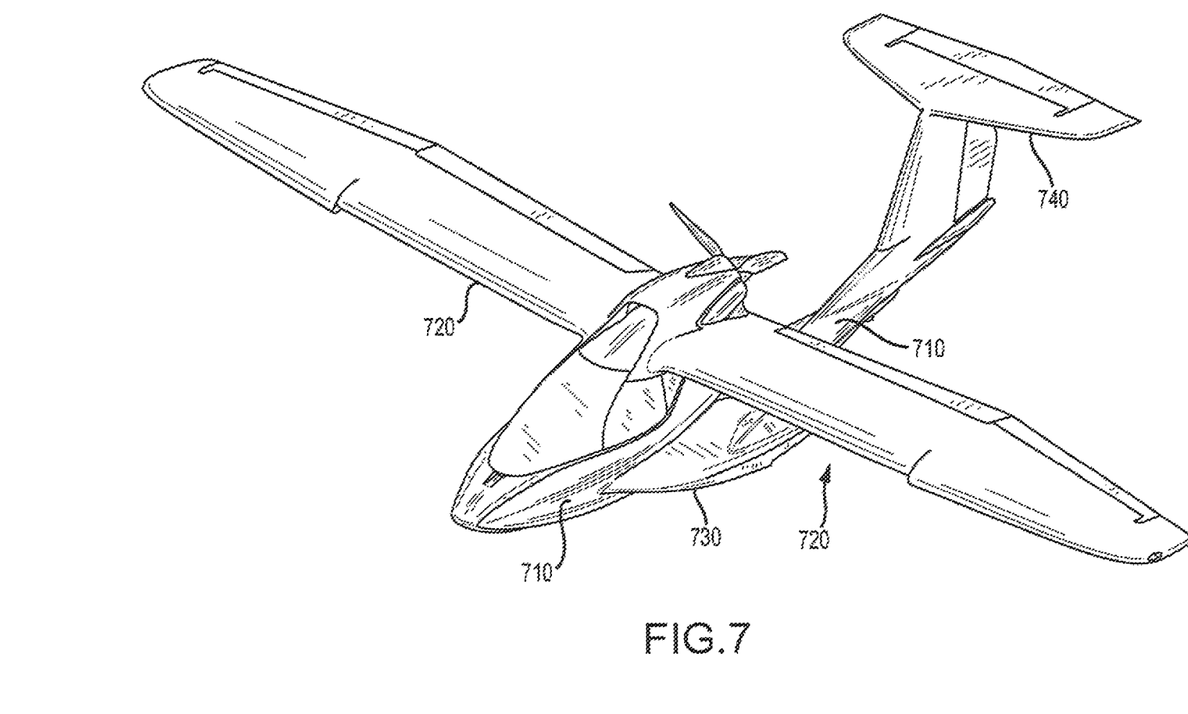
FIG. 7 is a front left perspective view of an amphibious aircraft with a spin resistant wing configuration according to one embodiment of the present invention.

In another embodiment, one or more delta vortex generators attached to the leading edge of the wing can also be employed to generate a strong vortex at a certain position along the wing span that are operable to restrict the stall to the inboard sections of the wing. Such a vortex generator is illustrated, for example in FIG. 6. As shown, the delta vortex generator 630 described is incorporated into the cuff, enhancing the effectiveness of the cuff for producing a focused vortex. The vortex generator 630 extends the leading edge of the outboard section 610 overlapping the inboard section 620 of the wing. At high angles of attack, airflow passes from beneath the outboard section 610 and around the cuff root and vortex generator. The vortex generator 630 energizes the flow, enhancing the creation of an aerodynamic fence.

Another aspect of the present invention is the inclusion of vortex generators on the wing, above the leading edge, outboard of the cuff. The vortex generators add energy to the airflow, reducing boundary layer thickness and enabling the airflow to remain attached to the wing to higher angle of attack. Another feature of the present invention is not only the incorporation of a plurality of varied airfoils across the span of the wing, but a wing twist that places the wing root at a higher angle of attack than the wing tip. As the angle of attack of the wing is increased, the wing root will experience a higher local angle of attack than the wing tip and stall first. While the wing twist and the implementation of various airfoils continually varies from root to tip, there is a discrete change at the cuff creating a fence.

To further enhance the aircraft's resistance to a spin, the tail area and span are modified to be in concert with modifications of the wing to enhance stability in a stall and spin resistance. To improve longitudinal stability, the span of the tail 740 is increased and a horizontal tail tip with an increased sweep is added.

Figure 8:
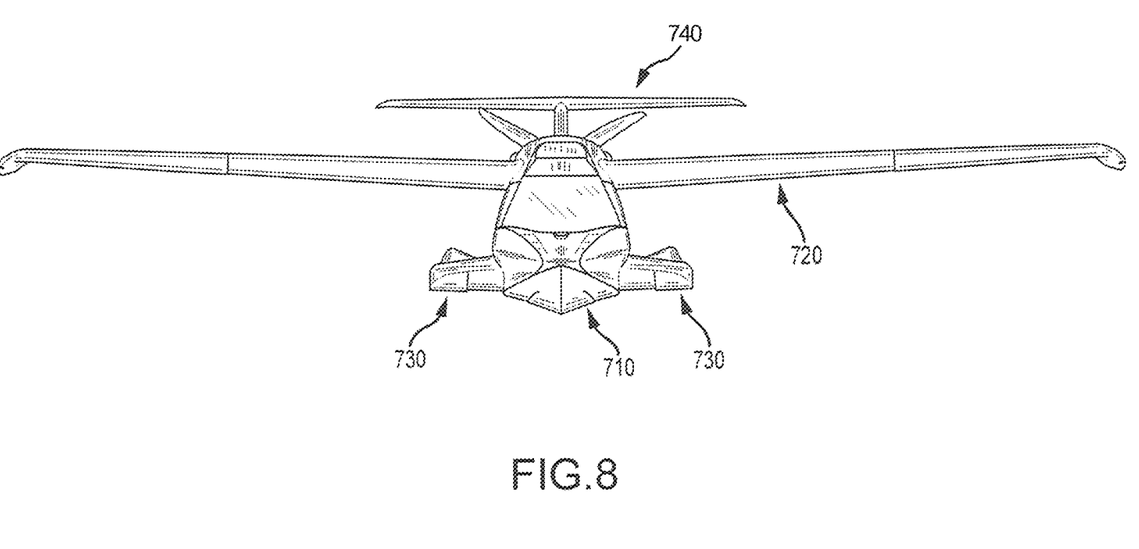
FIG. 8 is a front view of an amphibious aircraft with a spin resistant wing configuration according to one embodiment of the present invention.

The combinations of features described above with respect to the wing are also enhanced by their relationship to the aircraft fuselage as shown in FIG. 1 and in FIG. 8. In one embodiment of the present invention, the various combinations of airfoil selection, wing twist, stall strips, wing cuff and vortex generators are fashioned in consideration with the interaction of airflow around the fuselage 710 of an amphibious aircraft. In a high wing configuration 720 on top of a fuselage that includes a sponson 730 or sea wing, the airflow over the inboard sections of the wing area is affected by the airflow over the fuselage and sponson or sea wing. The forward position of the sponson or sea wing with respect to the leading edge of the wing acts, in high angle of attack situations, to direct the airflow, reducing the wing's effective angle of attack and therefore its lift. As a result, the local angle if incidence of the wing in the area of the sponson or seawing can be increased to make up for the seawing-induced loss of lift, thereby promoting the desirable root-first wing stall progression.

As the Figures illustrate, the aircraft develops a stable and isolated stall cell confined to the inboard sections of the wing. At full control input, a significant portion of the outboard section of the wing, including a significant portion of both ailerons, retain attached flow. The remaining inboard sections of the wing experience either reverse or lateral flow. Despite rolling or yawing the aircraft, the stall cells remain confined. This confinement of the stall cell promotes spin resistant behavior.

The present invention provides a spin resistant configuration. By combining the features of the present invention in a coordinated manner, each individual feature interacts synergistically to create a stable stall cell that is trapped on the inboard portions of the wing. The stable and trapped stall cell combined with an emmpanage that remains effective provides the pilot with adequate roll, pitch and yaw control, despite the fact that the wing is in a full stall, to resist entry into a spin. Indeed flight tests have demonstrated that the stall cell is so well confined that even with full aft controls and full deflection of the rudder, thus inducing yaw into the stall condition, the aircraft remains completely controllable.

Upon reading this disclosure, those of skill in the art will appreciate still additional alternative structural and functional designs for a system and a process for a spin resistant aircraft configuration through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

It will also be understood by those familiar with the art, that the invention may be embodied in other specific forms without departing from the spirit or essential characteristics thereof. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

The invention claimed is:

1. A spin resistant aircraft wing, the wing comprising:
   a first wing region of the spin resistant aircraft wing, wherein the first wing region includes a first airfoil shape and wherein the first wing region is adjacent to a fuselage of an aircraft at a wing root;
   a second wing region of the spin resistant aircraft wing, wherein the second wing region includes a second airfoil shape and is adjacent to a wing tip of the aircraft, wherein the first wing region is contiguous with the second wing region and wherein the second wing region includes one or more flight control surfaces and wherein the wing root angle of incidence is modified along the wing such that at 0-19% semi-span, it is 5 degrees and changes to 2 degrees at 60% semi-span; and a discontinuity in a leading edge of the spin resistant aircraft wing forming an aerodynamic barrier from the leading edge to a trailing edge of the spin resistant aircraft wing isolating airflow associated with the first wing region from airflow associated with the second wing region and wherein at high angles of attack a stall cell and associated separated airflow remains in the first wing region apart from the second wing region and apart from the one or more flight control surfaces so as to retain aircraft control with the presence of the stall cell in the first wing region.

2. The spin resistant aircraft wing of claim 1, wherein the discontinuity is a delta vortex generator.

3. The spin resistant aircraft wing of claim 1, further comprising an empennage coupled to the fuselage wherein the stall cell and associated separated airflow remains apart from the empennage.

4. The spin resistant aircraft wing of claim 1, wherein the discontinuity is a wing cuff in the leading edge.

5. The spin resistant aircraft wing of claim 4, wherein the wing cuff is positioned at 60% semi-span of the spin resistant aircraft wing.

6. The spin resistant aircraft wing of claim 4, wherein the wing cuff is positioned at 50% semi-span of the spin resistant aircraft wing.

7. The spin resistant aircraft wing of claim 1, further comprising a single stall strip located at 33-39% semi-span of the spin resistant aircraft wing.

8. The spin resistant aircraft wing of claim 7, wherein the single stall strip is parallel to the leading edge.

9. The spin resistant aircraft wing of claim 1, further comprising a one or more stall strips located on the leading edge of the first wing region and wherein an inboard most stall strip is angled downward 7 degrees and located.

\* \* \* \* \*